(12) United States Patent
Takeda et al.

(10) Patent No.: US 10,621,730 B2
(45) Date of Patent: Apr. 14, 2020

(54) MISSING FEET RECOVERY OF A HUMAN OBJECT FROM AN IMAGE SEQUENCE BASED ON GROUND PLANE DETECTION

(71) Applicant: SONY CORPORATION, Tokyo (JP)

(72) Inventors: Hiroyuki Takeda, San Jose, CA (US); Mohammad Gharavi-Alkhansari, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 120 days.

(21) Appl. No.: 15/986,355

(22) Filed: May 22, 2018

(65) Prior Publication Data

US 2019/0362500 A1 Nov. 28, 2019

(51) Int. Cl.
*G06T 7/194* (2017.01)
*G06T 7/50* (2017.01)
*G06T 5/00* (2006.01)
*G06T 5/20* (2006.01)

(52) U.S. Cl.
CPC ............. *G06T 7/194* (2017.01); *G06T 5/002* (2013.01); *G06T 5/20* (2013.01); *G06T 7/50* (2017.01); *G06T 2207/10024* (2013.01); *G06T 2207/10028* (2013.01); *G06T 2207/30196* (2013.01)

(58) Field of Classification Search
CPC .. H04N 13/257; H04N 13/261; H04N 13/128; H04N 13/15
See application file for complete search history.

(56) References Cited

U.S. PATENT DOCUMENTS

| 7,478,091 | B2* | 1/2009 | Mojsilovic | ............ G06F 19/321 |
| 7,544,321 | B2* | 6/2009 | Loebner | .................... F27B 3/16 |
| | | | | 266/241 |
| 8,073,247 | B1* | 12/2011 | Sandrew | .................. H04N 9/43 |
| | | | | 382/164 |
| 8,139,142 | B2* | 3/2012 | Bamji | ..................... G01S 17/89 |
| | | | | 348/348 |

(Continued)

FOREIGN PATENT DOCUMENTS

CN 104966099 A 10/2015
EP 2927878 A1 10/2015

OTHER PUBLICATIONS

International Search Report and Written Opinion of PCT Application No. PCT/US2019/033348, dated Aug. 22, 2019, 7 pages of ISRWO.

*Primary Examiner* — Yosef Kassa
(74) *Attorney, Agent, or Firm* — Chip Law Group

(57) ABSTRACT

An object segmentation system that includes a first type of sensor, a second type of sensor and a control circuitry. The first-type of sensor captures a sequence of color image frames of a scene. The second-type of sensor captures a depth image for each corresponding color image frame of the sequence of color image frames. The control circuitry generates a point cloud for an input color image frame. The control circuitry segments a foreground human object from a background of the input color image frame. The control circuitry detects a ground plane for the scene captured in the input color image frame. The control circuitry recovers a feet region in a defined region from a level of the detected ground plane. The control circuitry extracts the foreground human object with the recovered feet region from the background of the input color image frame, based on the detection of ground plane.

20 Claims, 12 Drawing Sheets

(56) References Cited

U.S. PATENT DOCUMENTS

| | | | |
|---|---|---|---|
| 8,401,336 B2* | 3/2013 | Baldridge | H04N 13/257 382/284 |
| 8,418,059 B2* | 4/2013 | Kitada | G06F 3/04847 715/255 |
| 8,678,006 B2* | 3/2014 | Porter, III | A61G 7/05776 128/845 |
| 9,235,895 B2 | 1/2016 | Ueda et al. | |
| 9,275,472 B2 | 3/2016 | Carr | |
| 2009/0252423 A1 | 10/2009 | Zhu et al. | |
| 2010/0166325 A1 | 7/2010 | Sengamedu et al. | |
| 2010/0277471 A1 | 11/2010 | Beato et al. | |
| 2015/0199816 A1 | 7/2015 | Freeman et al. | |
| 2016/0203361 A1 | 7/2016 | Black et al. | |

* cited by examiner

MISSING FEET RECOVERY OF A HUMAN OBJECT FROM AN IMAGE SEQUENCE BASED ON GROUND PLANE DETECTION

CROSS-REFERENCE TO RELATED APPLICATIONS/INCORPORATION BY REFERENCE

None.

FIELD

Various embodiments of the disclosure relate to object extraction technologies from an image sequence. More specifically, various embodiments of the disclosure relate to an object segmentation apparatus and method for an accurate missing feet recovery of a human object from an image sequence based on ground plane detection.

BACKGROUND

Recent developments in the field of image processing have led to advancements in various image segmentation techniques. Such techniques facilitates segmentation of an object-of-interest (such as a human body) from a specific image based on different statistical and/or probabilistic image feature-based methods. Examples of such object segmentation techniques may include a compression-based object segmentation technique, a color-based segmentation technique, a depth-based object segmentation technique, and a histogram-based object segmentation technique.

Currently, in a distinctive color-based segmentation approach, the object-of-interest may be segmented based on subtraction of a pre-determined static background image from captured image. However, in order to generate the pre-determined static background image, the conventional object segmentation apparatus is required to capture a sequence of images of the scene when the object-of-interest is not present in the scene, which may not be desirable. The pre-determined static background image of the scene may be generated from the captured sequence of images. The background image subtraction approach may further require capture of the sequence of images from the scene with a static camera. In another depth-based approach, the conventional apparatus may segment the object-of-interest by using a depth image which may be captured by a depth sensor. In cases where the depth sensor captures a noisy depth image comprising invalid depth values, the conventional object segmentation apparatus may segment the object-of-interest from the captured image erroneously and inaccurately. The object-of-interest, such as the human object, segmented based on these approaches, may be devoid of a feet region as the feet region is close to a ground plane where the segmentation may be inaccurate. Additionally, area around the feet region of the human object may also be altered by a shadow of the human object. Therefore, the segmented human object may have a missing feet region that may not be desirable.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An object segmentation apparatus and method for missing feet recovery of a human object from an image sequence based on ground plane detection is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
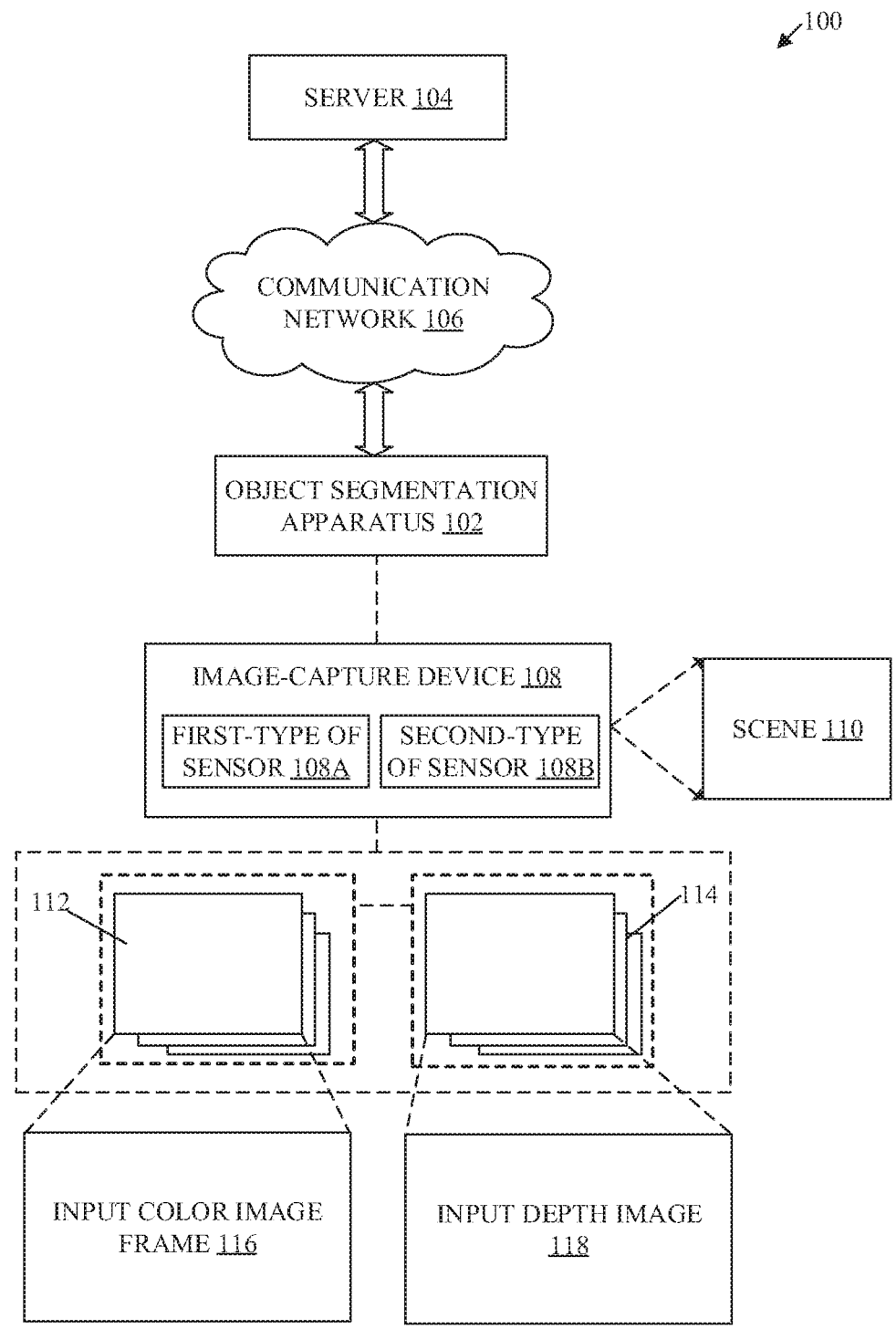
FIG. 1 is a block diagram that illustrates an exemplary network environment for missing feet recovery of a human object from an image sequence based on ground plane detection, in accordance with an embodiment of the disclosure

The following described implementations may be found in the disclosed apparatus and method for missing feet recovery of a human object from an image sequence based on ground plane detection. Exemplary aspects of the disclosure may include an object segmentation system that comprises a first-type of sensor and a second type of sensor. The first-type of sensor may be configured to capture a sequence of color image frames of a scene. The second-type of sensor may be configured to capture a depth image for each corresponding color image frame of the sequence of color image frames. The object segmentation system may further comprise a control circuitry configured to generate a point cloud for an input color image frame of the sequence of color image frames received from the first type of sensor. The point cloud for the input color image frame may be generated based on a corresponding input depth image for the input color image frame received from the second-type of sensor.

In accordance with an embodiment, the object segmentation apparatus may be configured to segment a foreground human object from a background of the input color image frame based on a first set of image parameters. The segmented foreground human object may be devoid of at least a portion of a feet region of the foreground human object. The object segmentation apparatus may be further configured to detect a ground plane for the scene captured in the input color image frame, based on orientation information associated with each vector projected from each point in the generated point cloud. In accordance with an embodiment, the ground plane may be detected by clusterization of a plurality of vectors projected from a plurality of points in the generated point cloud into a set of vector clusters. The ground plane for the scene may be detected based on orientation information associated with one vector cluster of the set of vector clusters in the generated point cloud. The object segmentation apparatus may recover a feet region in a defined region from a level of the detected ground plane in the input color image frame, based on a second set of image parameters. The second set of image parameters may be different from the first set of image parameters. The object segmentation apparatus may be further configured to extract the foreground human object with the recovered feet region from the background of the input color image frame of the sequence of color image frames. The foreground human object with the recovered feet region may be extracted based on the detection of ground plane and the determined plurality of foreground pixels in the defined region from the level of the detected ground plane.

In accordance with an embodiment, the object segmentation apparatus may detect a plurality of regions in the input depth image at which depth values are absent. The object segmentation apparatus may be configured to smoothen the input depth image by a median filter and a uniform filter to fill depth values at the plurality of regions and reduce noise in the input depth image. The object segmentation apparatus may be further configured to determine a three-dimensional (3D) coordinate of each point of the plurality of points in the generated point cloud, based on the input depth image. The object segmentation apparatus may compute a plurality of vectors projected from the plurality of points in the generated point cloud for the scene captured in the input color image frame. The plurality of vectors projected from the plurality of points in the generated point cloud may be computed based on three-dimensional coordinates of a point-of-interest and two neighboring points of the point-of-interest in the plurality of points of the generated point cloud.

In accordance with an embodiment, the object segmentation apparatus may be configured to cluster the computed plurality of vectors associated with the plurality of points in the generated point cloud into a set of vector clusters. The computed plurality of vectors may be clustered based on orientation information associated with each of the computed plurality of vectors associated with the plurality of points in the generated point cloud. The object segmentation apparatus may be configured to detect a plurality of planes for the scene captured in the input color image frame, based on the set of vector clusters associated with the scene captured in the input color image frame.

In accordance with an embodiment, the object segmentation apparatus may generate a plane map based on the set of vector clusters associated with the scene captured in the input color image frame. Additionally, the plane map may be generated by mapping the detected plurality of planes in image domain of the input color image frame. The plane map may comprise pixels grouped in different planes of the detected plurality of planes in the plane map. The pixels may be grouped based on same orientation information associated with each pixel in the plane map irrespective of spatial location of the pixels in the plane map in the image domain of the input color image frame of the scene. The object segmentation apparatus may be further configured to detect a plurality of isolated regions in the detected plurality of planes in the plane map. The plurality of isolated regions may be detected based on an area size of plurality of isolated regions in the plane map that is less than a first threshold number of pixels in the image domain. The object segmentation apparatus may eliminate the detected plurality of isolated regions in the plane map. The object segmentation apparatus may further smoothen the detected plurality of isolated regions that are less than a second threshold number of pixels in the image domain by a median filter.

In accordance with an embodiment, the object segmentation apparatus may select a lowest plane in the detected plurality of planes in the plane map from a reference height for the scene. The reference height may correspond to a height of the first-type of sensor that captures the sequence of color image frames of the scene. The selected lowest plane in the detected plurality of planes in the plane map may be the ground plane for the scene captured in the input color image frame. The object segmentation apparatus may be configured to segregate pixels in different horizontal planes in the plane map based on a height-based distribution of the pixels in the plane map. The object segmentation apparatus may be further configured to classify pixels present in a lowest horizontal plane as compared to other pixels in the different horizontal planes as the pixels of the ground plane based on the height-based distribution of the pixels in the plane map.

In accordance with an embodiment, the object segmentation apparatus may be configured to estimate a foreground mask of the foreground human object in the input color image frame of the scene using the input depth image and the first set of image parameters. The foreground mask of the foreground human object in the input color image frame of the scene may be estimated by binarizing a difference between the input color image frame and a background image of the input color image frame. The foreground human object may be segmented from the background of the input color image frame based on the estimated foreground mask. The object segmentation apparatus may be further configured to update the estimated foreground mask to include a set of pixels in the defined region from the level of the detected ground plane in the input color image frame. The set of pixels may correspond to pixels of the feet region that are recovered based on the second set of image parameters.

FIG. 1 is a block diagram that illustrates an exemplary network environment for missing feet recovery of a human object from an image sequence based on ground plane detection, in accordance with an embodiment of the disclosure. With reference to FIG. 1, there is shown a network environment 100. The network environment 100 may include an object segmentation apparatus 102, a server 104, a communication network 106, and an image-capture device 108. The object segmentation apparatus 102 may be communicatively coupled to the image-capture device 108. The image-capture device 108 may comprise a first-type of sensor 108A and a second-type of sensor 108B. In accordance with an embodiment, the first-type of sensor 108A may be an image sensor and the second-type of sensor 108B may be a depth sensor. The first-type of sensor 108A may be configured to capture a sequence of color image frames 112 of a scene 110 from a field of view of the image-capture device 108. The second-type of sensor 108B may be configured to capture a sequence of depth images 114 that includes the same field of view as of the sequence of color image frames 112 of the scene 110. The sequence of color image frames 112 may comprise an input color image frame 116. The sequence of depth images 114 may comprise an input depth image 118 that corresponds to the input color image frame 116. The scene 110 may comprise an object-of-interest (such as a human object). The scene 110 may further comprise a plurality of other objects, such as a table, a door, a chair, a computer, and the like. The object segmentation apparatus 102 may be communicatively coupled to the server 104, via the communication network 106.

The object segmentation apparatus 102 may comprise suitable logic, circuitry, and interfaces that may be configured to receive the sequence of color image frames 112 of the scene 110 captured by the first-type of sensor 108A of the image-capture device 108. The object segmentation apparatus 102 may further receive the sequence of depth images 114 corresponding to the sequence of color image frames 112 that are captured by the second-type of sensor 108B of the image-capture device 108. The object segmentation apparatus 102 may be configured to segment a foreground human object from a background of the input color image frame 116 of the sequence of color image frames 112 of the scene 110. The object segmentation apparatus 102 may be configured to detect a ground plane for the scene 110 captured in the input color image frame 116. The object segmentation apparatus 102 may be further configured to recover a missing feet region from the segmented foreground human object from the input color image frame 116 of the scene 110, based on the detected ground plane. The functionalities of the object segmentation apparatus 102 may be implemented in local devices, such as a high-speed computing device, or remote devices, such as an application server or a graphical image processing server. Examples of the object segmentation apparatus 102 may include, but are not limited to a digital camera, a digital camcorder, a camera phone, a smart phone, a portable music player, a gaming console, a tablet computer, a mobile device, a video player, a video disc writer/player. Other examples of the object segmentation apparatus 102 may include, but are not limited to a television, a home entertainment system, an augmented reality device, a virtual reality device, a smart watch or any other suitable computing device and the like.

The server 104 may comprise suitable circuitry, and interfaces that may be configured to store the sequence of color image frames 112 of the scene 110 and the sequence of depth images 114 of the scene 110. The server 104 may be further configured to store a segmented human object and recovered missing feet of the segmented human object from the background of the sequence of color image frames 112 of the scene 110. In some embodiments, the server 104 may be implemented as a cloud server, which may be utilized to execute aforementioned operations of the server 104 through web applications, cloud applications, HTTP requests, database operations, file transfer, gaming operations, and the like.

The communication network 106 may include a communication medium through which the object segmentation apparatus 102 may be communicatively coupled to the server 104. Examples of the communication network 106 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 106, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The image-capture device 108 may comprise suitable logic, circuitry, and interfaces that may be configured to capture a plurality of color images and a plurality of depth images of the scene 110. The image-capture device 108 may comprise a plurality of sensors (such as the first-type of sensor 108A and the second-type of sensor 108B). The captured plurality of color images and plurality of depth images may be stored in the server 104. In some embodiments, the image-capture device 108 comprising the first-type of sensor 108A and the second-type of sensor 108B may be present in the object segmentation apparatus 102. Examples of the image-capture device 108 may include, but are not limited to, a camera, an image sensor, a color sensor (such as a red-green-blue (RGB) sensor), a depth sensor, and the like.

The first type of sensor 108A (such as an image sensor) may comprise suitable logic, circuitry, interfaces, and/or code that may be configured to capture the plurality of color images of the scene 110. The first-type of sensor 108A may have suitable optical instruments such as focusing lenses which may focus the scene 110 and/or a particular object-of-interest in the scene 110 on the first-type of sensor 108A. Examples of implementation of the first-type of sensor 108A may include, but is not limited to a RGB sensor, semiconductor charged coupled device (CCD) based image sensor, a Complementary metal-oxide-semiconductor (CMOS) based image sensor, an N-type metal-oxide-semiconductor based image sensor, a flat panel detector, or other image sensors.

The second type of sensor 108B (such as a depth sensor) may comprise suitable logic, circuitry, interfaces, and/or code that may be configured to capture the plurality of depth images from the scene 110. Each of the plurality of depth images may comprise depth information associated with various objects in the scene 110 at various time instants at which the respective depth image may be captured by the second-type of sensor 108B. Examples of implementation of the second-type of sensor 108B may include, but is not limited to a depth sensor, a stereo triangulation based depth sensor, a structured light 3D scanner based depth sensor, or a coded aperture based depth sensor.

In operation, the first-type of sensor 108A of the image-capture device 108 may be configured to capture the sequence of color image frames 112 of the scene 110 from a field of view of the image-capture device 108. The sequence of color image frames 112 may be a video such as a flash video, an audio video interleaved (AVI) video, and a moving pictures expert group (MPEG) video. The captured sequence of color image frames 112 may comprise a plurality of objects of the scene 110. The captured sequence of color image frames 112 may further comprise the human object. Each color image frame of the sequence of color image frames 112 may comprise a plurality of pixels. Each of the plurality of pixels of a color image frame may comprise a color component and have a spatial position in the color image frame. The first-type of sensor 108A may be configured to transmit the sequence of color image frames 112 to the object segmentation apparatus 102. The sequence of color image frames 112 may comprise the input color image frame 116.

The second-type of sensor 108B of the image-capture device 108 may be configured to capture a depth image for each corresponding color image frame of the sequence of color image frames 112. The second-type of sensor 108B may capture the depth image for each corresponding color image frame of the sequence of color image frames 112, concurrently with the capture of the sequence of color image frames 112 by the first-type of sensor 108A. Alternatively stated, the second-type of sensor 108B may be configured to capture the sequence of depth images 114 corresponding to the sequence of color image frames 112 of the scene 110.

Each of the sequence of depth images 114 may correspond to a different color image frame of the sequence of color image frames 112. The depth image of each color image frame of the sequence of color image frames 112 may comprise depth information associated with the scene 110 at a corresponding time instant when the respective color image frame may be captured. Each of the sequence of depth images 114 may comprise a plurality of pixels. Each of the plurality of pixels of a depth image may comprise a depth value and have a spatial position in the depth image. The second-type of sensor 108B may be configured to transmit the sequence of depth images 114 to the object segmentation apparatus 102. The sequence of depth images 114 may comprise an input depth image 118 of the input color image frame 116.

In accordance with an embodiment, the object segmentation apparatus 102 may be configured to receive the sequence of color image frames 112 and the corresponding sequence of depth images 114 from the image-capture device 108. Alternatively stated, the object segmentation apparatus 102 may be configured to receive the input color image frame 116 and the corresponding input depth image 118 of the scene 110. The object segmentation apparatus 102 may be configured to detect a plurality of regions in the input depth image 118 at which the depth values are absent. The object segmentation apparatus 102 may smoothen the input depth image 118 to fill in depth values at the plurality of regions at which the depth values are absent and reduce noise in the input depth image 118. The input depth image 118 may be smoothened based on a 3×3 median filter. The 3×3 median filter may be a non-linear filter that employs a non-linear filtering technique to fill in depth values at the plurality of regions at which the depth values are absent in the input depth image 118. The 3×3 median filter may also be utilized to remove "salt and pepper" type noise from the input depth image 118. The "salt and pepper" type noise may also be known as impulse noise that is caused by sharp and sudden disturbances in an image signal. In some embodiments, the object segmentation apparatus 102 may also utilize a 7×7 filter to remove "Gaussian-type" noise from the input depth image 118. The 7×7 uniform filter may utilize a linear filtering technique to remove the "Gaussian-type" noise that arises during acquisition or at the time of capture of the input depth image 118 due to poor illumination or high temperature.

In accordance with an embodiment, the object segmentation apparatus 102 may be configured to generate a point cloud of the input color image frame 116 based on the smoothened input depth image 118. The point cloud is a collection of points that represents the captured scene in the input color image frame 116 in a three-dimensional coordinate system. The points of the point cloud of the input color image frame 116 is defined by "X", "Y", and "Z" coordinates in the three-dimensional coordinate system. The point cloud of the input color image frame 116 of the scene 110 may be generated based on the input depth image 118. The three-dimensional coordinates of each point of the generated point cloud may be determined based on the depth values of the input depth image 118. The coordinates "0,0,0" for the "X,Y,Z" coordinates in the three-dimensional coordinate system may represent the position of the image-capture device 108 in the three-dimensional coordinate system.

In accordance with an embodiment, the object segmentation apparatus 102 may be configured segment a foreground human object from a background of the input color image frame 116 based on a first set of image parameters. The object segmentation apparatus 102 may be configured to segregate a background image from the input color image frame 116. The object segmentation apparatus 102 may further be configured to estimate an initial foreground mask using the input depth image 118 corresponding to the input color image frame 116. The initial foreground mask may be further estimated by binarizing a difference between the input color image frame 116 and the background image of the input color image frame 116. The object segmentation apparatus 102 may be configured to identify a first set of pixels with a first mask value in a boundary region of the estimated initial foreground mask. The first set of pixels with the first mask value may be updated to a second mask value based on the first set of image parameters that may be color components, a depth component, and a spatial position of each pixel associated with the boundary region.

The object segmentation apparatus 102 may be configured to estimate a foreground mask of the foreground human object based on the updated second mask value of the initial foreground mask. The object segmentation apparatus 102 may generate a segmented foreground human object. In certain scenarios, the segmented foreground human object that may be devoid of a portion of a feet region of the foreground human object. The segmented foreground human object may be devoid of the feet region due to presence of the feet region of the foreground human object close to a ground plane of the input color image frame 116. Such proximity of the feet region to the ground plane of the input color image frame 116 may occlude the feet region from the segmented foreground human object. Alternatively stated, the segmented foreground human object may be devoid of the feet region as the difference between the input color image frame 116 and the background image of the input color image frame 116 may be minimal for the feet region. Additionally, the occlusion of the feet region in the segmented foreground human object may be caused by shadows of the human object onto the feet region of the human object. In such scenarios, the object segmentation apparatus 102 may be configured to compute a plurality of vectors projected from a plurality of points of the generated point cloud for the scene 110 captured in the input color image frame 116. Each vector of the computed plurality of vectors may be a surface normal vector that may be normal to a point of the plurality of points of the generated point cloud. A vector for a point-of-interest from the plurality of points of the generated point cloud may be computed based on the three-dimensional coordinates of the point-of-interest and two neighboring points of the point-of-interest of the generated point cloud. The two neighboring points may include a point positioned at immediate right of the point-of-interest and a point positioned at immediate bottom of the point-of-interest. The vector may be computed for the point-of-interest only when it has two neighboring points in the generated point cloud.

The object segmentation apparatus 102 may be configured to cluster the computed plurality of vectors associated with the plurality of points in the generated point cloud into a set of vector clusters. The plurality of vectors may be clustered into the set of vector clusters based on orientation information associated with each of the computed plurality of vectors. For example, K-means clustering may be utilized for clustering the computed plurality of vectors into the set of vector clusters. The clustering of the computed plurality of vectors into the set of vector clusters may be executed in an orientation space. The set of vector clusters may correspond to one or more planes in the scene 110 captured in the input color image frame 116. The object segmentation apparatus 102 may be further configured to plot the computed plurality of vectors on a unit sphere to analyze a distribution of the computed plurality of vectors in the set of vector clusters.

In accordance with an embodiment, the object segmentation apparatus 102 may be configured to detect a plurality of planes for the scene 110 captured in the input color image frame 116, based on the set of vector clusters associated with the scene 110. Each vector cluster of the set of vector clusters may correspond to a plane of the scene 110 captured in the input color image frame 116. All the vectors of a vector cluster of the set of vector clusters may be associated with the same orientation information which may be the orientation information of the plane corresponding to that vector cluster. Each of the plurality of planes may be detected as an individual and separate surface in the captured scene 110. The object segmentation apparatus 102 may be further configured to generate a plane map based on the set of vector clusters associated with the scene 110 captured in the input color image frame 116. The plane map may be generated by mapping the detected plurality of planes in an image domain of the input color image frame. The generated plane map may comprise pixels grouped in different planes of the detected plurality of planes in the plane map. The pixels may be grouped based on the same orientation information associated with each pixel in the plane map irrespective of spatial location of the pixels in the plane map. Alternatively stated, the pixels with the same orientation information may be grouped as one group in the plane map in the image domain of the input color image frame 116.

In accordance with an embodiment, the object segmentation apparatus 102 may be configured to detect a plurality of isolated regions in the detected plurality of planes in the plane map. The isolated regions may be detected based on an area size of the plurality of isolated regions that is less than a first threshold number of pixels in the plane map in image domain. Alternatively stated, the isolated regions may be small regions in the plan map and the area size of each of the plurality of isolated regions in the plane map may be less than the first threshold number of pixels, for example "100" pixels, in the plane map in image domain. The object segmentation apparatus 102 may be configured to eliminate the detected plurality of isolated regions in the plane map. The object segmentation apparatus 102 may be further configured to smoothen the detected plurality of isolated regions that are less than a second threshold number of pixels in the image domain by a type of median filter. The detected plurality of isolated regions that are less than a second threshold number of pixels may be smoothened based on the 3×3 median filter.

In accordance with an embodiment, the object segmentation apparatus 102 may be configured to select a lowest plane in the detected plurality of planes in the plane map from a reference height for the scene 110 captured in the input color image frame 116. The reference height may correspond to a height of the image-capture device 108 that captures the sequence of color image frames 112 of the scene 110. In some embodiment, the selected lowest plane in the detected plurality of planes in the plane map may correspond to the ground plane for the scene 110 captured in the input color image frame 116. The orientation of the surface normal vectors of the lowest horizontal plane may be in a direction facing upwards (i.e. from bottom to top). Additionally, the object segmentation apparatus 102 may be configured to segregate pixels in different horizontal planes with the orientation information same as that of the ground plane in the plane map based on a height-based distribution of the pixels in the plane map. The orientation of the surface normal vectors of the different horizontal planes may be in a direction facing upwards (i.e. from bottom to top). The object segmentation apparatus 102 may be further configured to classify pixels present in a lowest horizontal plane as compared to other pixels in the different horizontal planes of the plane map. Alternatively stated, the object segmentation apparatus 102 may select the lowest horizontal plane from different horizontal planes, which comprises the maximum number of pixels based on the height based distribution of the plane map, as the ground plane.

In accordance with an embodiment, the object segmentation apparatus 102 may be configured to detect a plurality of foreground pixels located in a defined region from a level of the detected ground plane, for example 20 mm to 150 mm from the level of the detected ground plane. The object segmentation apparatus 102 may be further configured to recover the feet region of the human object present on the detected ground plane of the scene 110 captured in the input color image frame 116. The feet region of the human object may be recovered based on a second set of image parameters that may be different from the first set of image parameters. The recovered feet region may comprise a set of foreground pixels present in the defined region from the level of the ground plane. For example, in a scenario, a Mean-shift filter may be utilized to segment the foreground human object from the background of the input color image frame 116. The Mean-shift filter may be used to correct certain errors in the foreground mask one pixel at a time using the probability density function (PDF) of the pixels near the position of interest. The probability density function may be estimated using a kernel density function based on a Gaussian kernel. The first set of image parameters and the second set of image parameters may be bandwidths of the Gaussian kernel used to estimate the probability density function of the area of interest. The bandwidth of the Gaussian kernel associated with the first set of image parameters may be higher than the bandwidth of the Gaussian kernel associated with the second set of image parameters. The foreground human object may be segmented from a background of the input color image frame 116 based on a first set of image parameters that may be associated with the higher bandwidth of the Gaussian kernel as compared to the second set of image parameter. Additionally, the second set of image parameters that are associated with lower bandwidth of the Gaussian kernel than the first set of image parameters, may be utilized to recover the feet region of the human object present on the detected ground plane of the scene 110 captured in the input color image frame 116.

In accordance with an embodiment, the object segmentation apparatus 102 may update the estimated foreground mask of the human object to include the set of pixels of the recovered feet region of the human object. The estimated foreground mask may be updated based on the second set of image parameters. Additionally, the object segmentation apparatus 102, may extract the foreground human object with the recovered feet region of the human object present close to the detected ground plane of the scene 110 captured in the input color image frame 116. The extracted foreground human object may comprise the recovered feet region of the human object that may be absent in the segmented human object due to the presence of the feet region close to the ground plane. The object segmentation apparatus 102 may enables to segment the feet region of the human object even if shadows of the human object is present on the feet region of the human object that lie close to the ground plane of the scene 110 captured in the input color image frame 116 The object segmentation apparatus 102 may be further configured to generate the segmented human object with the recovered feet region of the human object. In accordance with an embodiment, the object segmentation apparatus 102 may display the segmented human object with the recovered feet region on a display screen.

Figure 2:
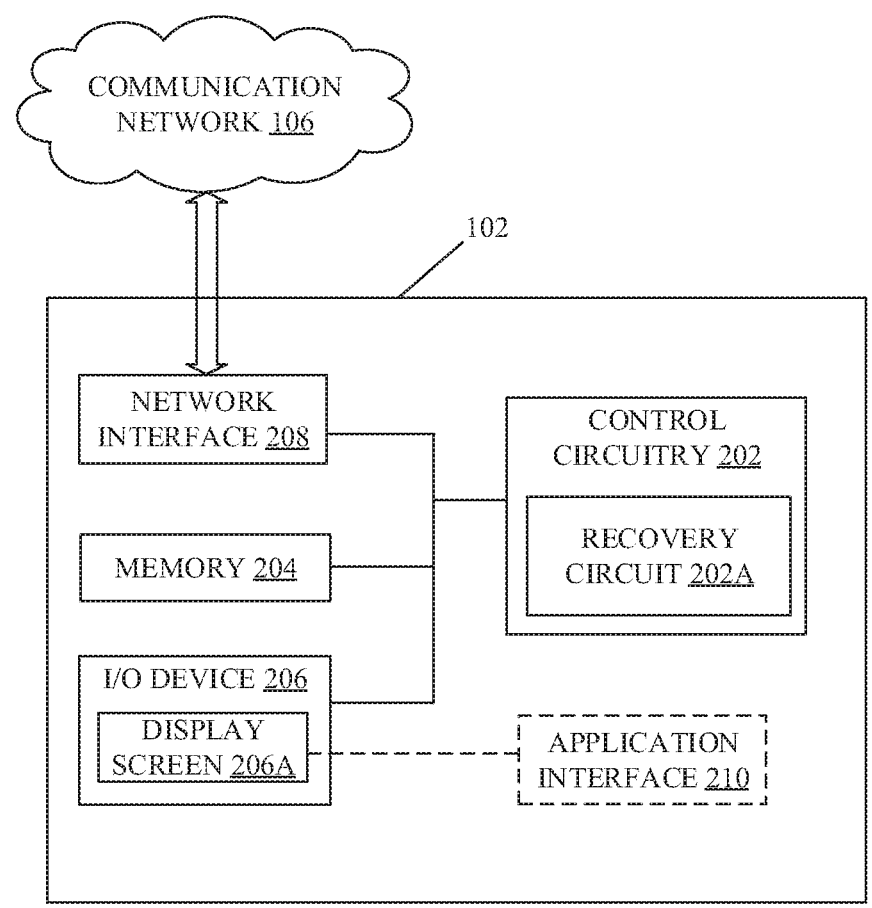
FIG. 2 is a block diagram that illustrates an exemplary object segmentation apparatus, in accordance with an embodiment of the disclosure.

FIG. 2 is a block diagram that illustrates an exemplary object segmentation apparatus, in accordance with an embodiment of the disclosure. FIG. 2 is explained in conjunction with elements from FIG. 1. With reference to FIG. 2, there is shown the object segmentation apparatus 102. The object segmentation apparatus 102 may include a control circuitry 202, a recovery circuit 202A, a memory 204, an input/output (I/O) device 206 and a network interface 208. The recovery circuit 202A may be a part of the control circuitry 202. The I/O device 206 may include a display screen 206A, which may be utilized to render an application interface 210. The control circuitry 202 may be communicatively coupled to the memory 204 and the I/O device 206. The control circuitry 202 may be configured to communicate with the server 104 and the image-capture device 108, by use of the network interface 208.

The control circuitry 202 may comprise suitable logic, circuitry, and interfaces that may be configured to generate a point cloud for the input color image frame 116 of the sequence of color image frames 112 received from the first type of sensor 108A, based on the corresponding input depth image 118 for the input color image frame 116 received from the second-type of sensor 108B. The control circuitry 202 may be further configured to segment a foreground human object from a background of the input color image frame 116 of the sequence of color image frames 112 of the scene 110. The control circuitry 202 may be configured to detect the ground plane from the plurality of planes. The control circuitry 202 may comprise one or more specialized processing units, which may be implemented as a separate processor or circuitry in the object segmentation apparatus 102. In an embodiment, the one or more specialized processing units and the control circuitry 202 may be implemented as an integrated processor or a cluster of processors that perform the functions of the one or more specialized processing units and the control circuitry 202, collectively. The control circuitry 202 may be implemented based on a number of processor technologies known in the art. Examples of implementations of the control circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The recovery circuit 202A may comprise suitable logic, circuitry, and interfaces that may be configured to recover a feet region from the detected ground plane for the segmented foreground human object. Examples of implementations of the recovery circuit 202A may be a specialized circuitry, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may comprise suitable logic, circuitry, and interfaces that may be configured to store a set of instructions executable by the control circuitry 202. The memory 204 may be configured to store data of operating systems and associated applications. The memory 204 may be further configured to store the sequence of color image frames 112 and the corresponding sequence of depth images 114. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, or a Secure Digital (SD) card.

The I/O device 206 may comprise suitable logic, circuitry, and interfaces that may be configured to receive an input from a user and provide an output to the user based on received input from the user. For example, the I/O device 206 may be utilized to initialize the operation to recover a missing feet of a segmented human object from a background of the captured sequence of color image frames 112 of the scene 110 based on a request from the user. The I/O device 206 may comprise various input and output devices, which may be configured to communicate with the control circuitry 202. Examples of the I/O device 206 may include, but are not limited to, a touch screen, a keyboard, a mouse, a joystick, a microphone, a display screen (for example, the display screen 206A), and a speaker.

The display screen 206A may comprise suitable logic, circuitry, and interfaces that may be configured to render the application interface 210 at the display screen 206A, for display of recovered missing feet of the segmented human object from a background of the captured sequence of color image frames 112 of the scene 110. In accordance with an embodiment, the display screen 206A may be configured to receive input from the user. In such a scenario, the display screen 206A may be a touch screen, which may enable the user to provide input. The touch screen may be at least one of a resistive touch screen, a capacitive touch screen, or a thermal touch screen. In accordance with an embodiment, the display screen 206A may receive the input through a virtual keypad, a stylus, a gesture-based input, or a touch-based input. The display screen 206A may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display screen 206A may refer to a display screen of a smart-glass device, a see-through display, a projection-based display, an electro-chromic display, or a transparent display.

The network interface 208 may comprise suitable logic, circuitry, and interfaces that may be configured to facilitate communication between the object segmentation apparatus 102 and the server 104, via the communication network 106. The network interface 208 may be implemented by use of various known technologies to support wired or wireless communication of the object segmentation apparatus 102 with the communication network 106. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may communicate via wireless communication with networks, such as the Internet, an Intranet or a wireless network, such as a cellular telephone network, a wireless local area network (LAN), and a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The application interface 210 may correspond to a user interface (UI) rendered on a display screen, such as the display screen 206A. The application interface 210 may display the recovered missing feet of the segmented human object from a background of the captured sequence of color image frames 112 of the scene 110. An example of the application interface 210 may include, but is not limited to, a graphical user interface (GUI).

The functions or operations executed by the object segmentation apparatus 102, as described in FIG. 1, may be performed by the control circuitry 202 and the recovery circuit 202A. The operations executed by the control circuitry 202 and the recovery circuit 202A are further described, for example, in the FIGS. 3A to 3G, 4A, and 4B.

FIGS. 3A, 3B, 3C, 3D, 3E, 3F and 3G, collectively, illustrate exemplary operations for missing feet recovery of a human object from an image sequence based on ground plane detection, in accordance with an embodiment of the disclosure. FIGS. 3A to 3G are explained in conjunction with elements from FIGS. 1 and 2.

Figure 3A:
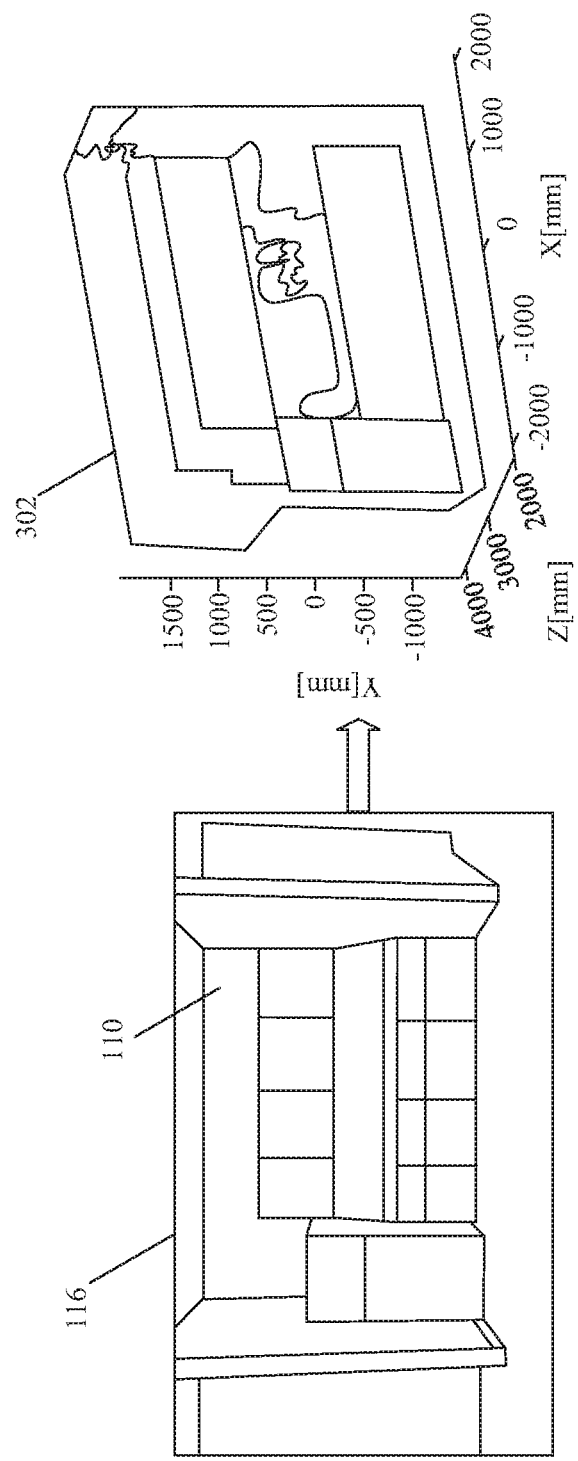
FIGS. 3A, 3B, 3C, 3D, 3E, 3F, 3G and 3H, collectively, illustrates exemplary operations for missing feet recovery of a human object from an image sequence based on ground plane detection, in accordance with an embodiment of the disclosure.

FIG. 3A illustrates generation of the point cloud of the input color image frame 116 of the sequence of color image frames 112 of the scene 110, in accordance with an embodiment of the disclosure. With reference to FIG. 3A, there is shown the input color image frame 116 and a point cloud 302 of the input color image frame 116. In accordance with an embodiment, the control circuitry 202 may be configured to generate the point cloud 302 for the input color image frame 116 of the sequence of color image frames 112 captured by the first-type of sensor 108A. The point cloud 302 may be generated based on the input depth image 118 (not shown in FIG. 3A) of the sequence of depth images 114 captured by the second-type of sensor 108B, post the smoothening operation on the input depth image 118. The point cloud 302 may represent different external surfaces of the scene 110 in the input color image frame 116 in the three-dimensional coordinate system. The points of the point cloud 302 may be defined by "X", "Y", and "Z" coordinates in the three-dimensional coordinate system. The depth values of the input color image frame 116 represented by the input depth image 118 may be utilized to compute the three-dimensional coordinates of each point of the generated point cloud 302. The coordinates "0,0,0" for the "X,Y,Z" coordinates in the three-dimensional coordinate system of the generated point cloud 302, may represent the position of the image-capture device 108 in the three-dimensional coordinate system.

Figure 3B:
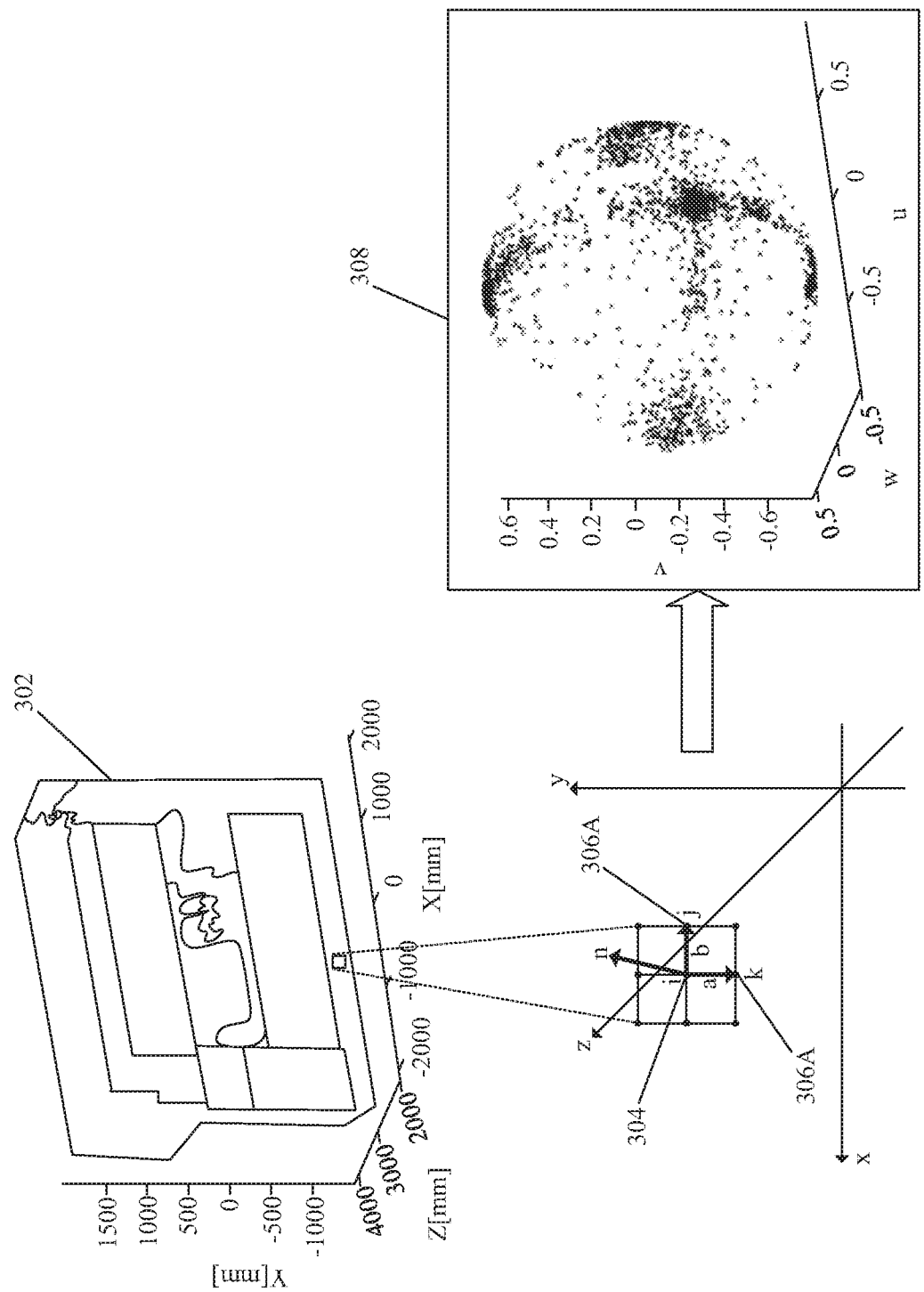
Figure 3C:
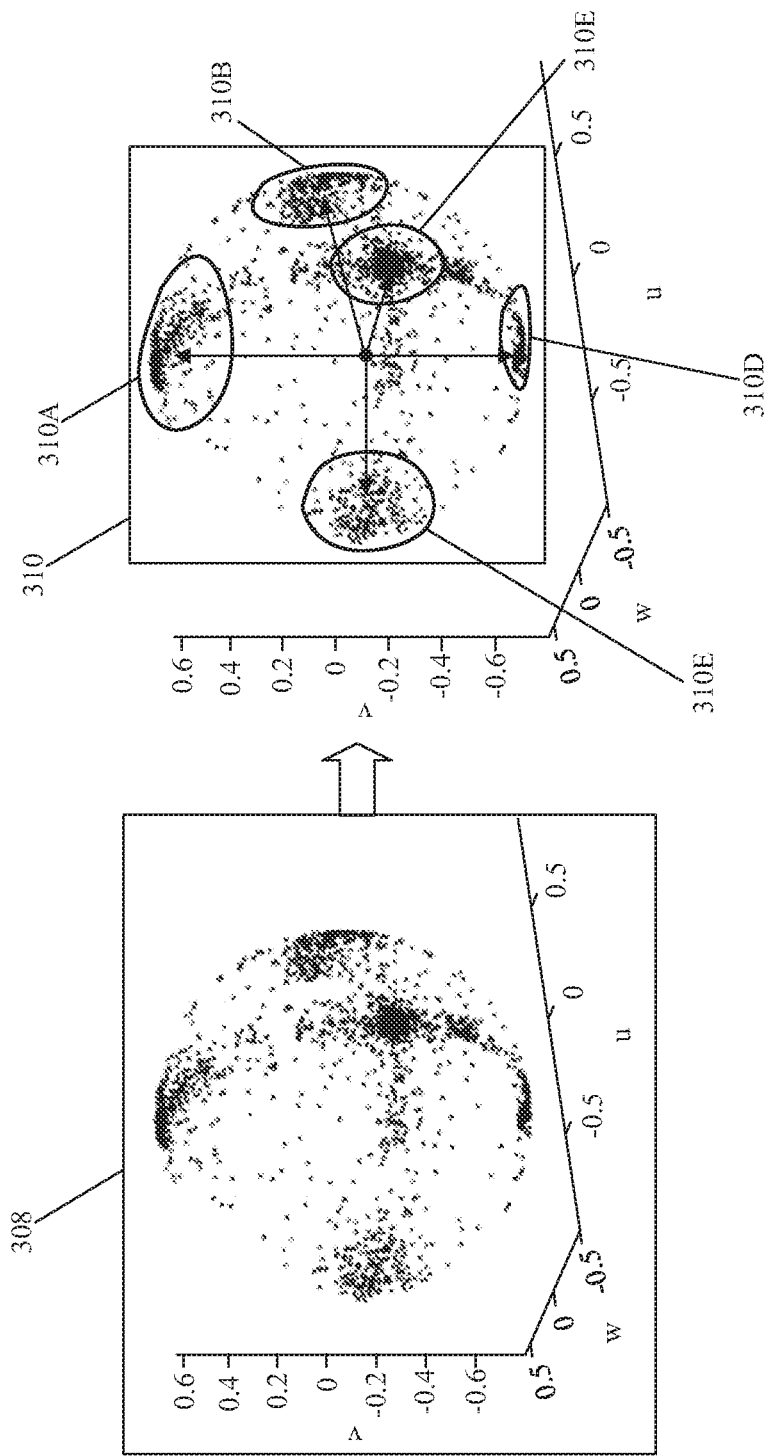

FIG. 3B illustrates computation of a plurality of vectors projected from the plurality of points of the generated point cloud, in accordance with an embodiment of the disclosure. With reference to FIG. 3B, there is shown the point cloud 302, a point-of-interest 304 (also represented as "i"), a first neighboring point 306A (also represented as "j") and a second neighboring point 306B (also represented as "k") and a unit sphere distribution 308 of the computed plurality of vectors on a unit sphere. In accordance with an embodiment, the control circuitry 202 may be configured to compute the plurality of vectors projected from the plurality of points of the generated point cloud 302. The control circuitry 202 may be configured to compute a vector "n" projected from a point-of-interest, such as the point-of-interest 304 (also represented as "i") based on the three-dimensional coordinated of the point-of-interest 304 and two neighboring points, such as the first neighboring point 306A ("j") and the second neighboring point 306B ("k"), of the point-of-interest 304. The computed vector "n" may be a surface normal vector that is normal to the point-of-interest 304 (also represented as "i"). The first neighboring point 306A ("j") may be positioned immediately right of the point-of-interest 304 ("i"). The second neighboring point 306B ("k") may be positioned at an immediate bottom of the point-of-interest 304. The vector "n" may be computed for the point-of-interest 304, only when the point-of-interest 304 has two neighboring points in the generated point cloud 302. A vector from the point-of-interest 304 to the first neighboring point 306A may be represented as a vector "b" and a vector from the point-of-interest "304 to the second neighboring point 306B may be represented as a vector "a". The control circuitry 202 may further be configured to plot the computed plurality of vectors on a unit sphere, such as the unit sphere distribution 308 of the computed plurality of vectors projected from the plurality of points of the point cloud 302. The vector "n" may be computed, for example, by equation (1) as given below:

$$n = \begin{bmatrix} u \\ v \\ w \end{bmatrix} = \frac{a \times b}{|a \times b|}$$

where "u", "v" and "w" represent the axes of the unit sphere distribution 308 of the computed plurality of vectors on the unit sphere;
a=k−i represents the vector "a" from point-of-interest 304 ("i") to the second neighboring point 306B ("k"); and
b=j−i represents the vector "a" from point-of-interest 304 to the first neighboring point 306A ("j");

FIG. 3C illustrates clustering of the plurality of vectors projected from the plurality of points of the point cloud, in accordance with an embodiment of the disclosure. With reference to FIG. 3C, there is shown the unit sphere distribution 308 of the plurality of vectors on the unit sphere and a set of vector clusters 310. In accordance with an embodiment, the control circuitry 202 may be configured to cluster the plurality of vectors projected from the plurality of points based on orientation information associated with each of the plurality of vectors. The plurality of vectors associated with same orientation information may be clustered together as the set of vector clusters 310. The plurality of vectors may be clustered based on K-means clustering. The set of vector clusters 310 may comprise a plurality of vector clusters associated with the plurality of vectors with same orientation information. The number of vector clusters in the set of vector clusters 310 may be determined based on the K-means clustering. The number of vector clusters in the set of vector clusters 310 may be same as the number of planes in the captured scene 110. For example, a first vector cluster 310A of the set of vector clusters 310 may comprise the plurality of vectors associated with same orientation information, such as the orientation of all the vectors in the first set of vector clusters may be in a direction from bottom to top (as represented by arrow marks). Similarly, the set of vector clusters may include a second vector cluster 310B comprising the plurality of vectors associated with same orientation information, that is in a direction from left to right, as shown. The set of vector clusters may comprise the plurality of vector clusters such as 310A, 310B, 310C, 310D and 310E. Each vector cluster of the set of vector clusters 310 may comprise the plurality of vectors associated with same orientation information. The control circuitry 202 may be further configured to detect a plurality of planes for the scene 110 captured in the input color image frame 116, based on the set of vector clusters 310 associated with the scene 110. The plurality of vector clusters (310A, 310B, 310C, 310D and 310E) of the set of vector clusters 310 may correspond to the plurality of planes of the captured scene 110.

Figure 3D:
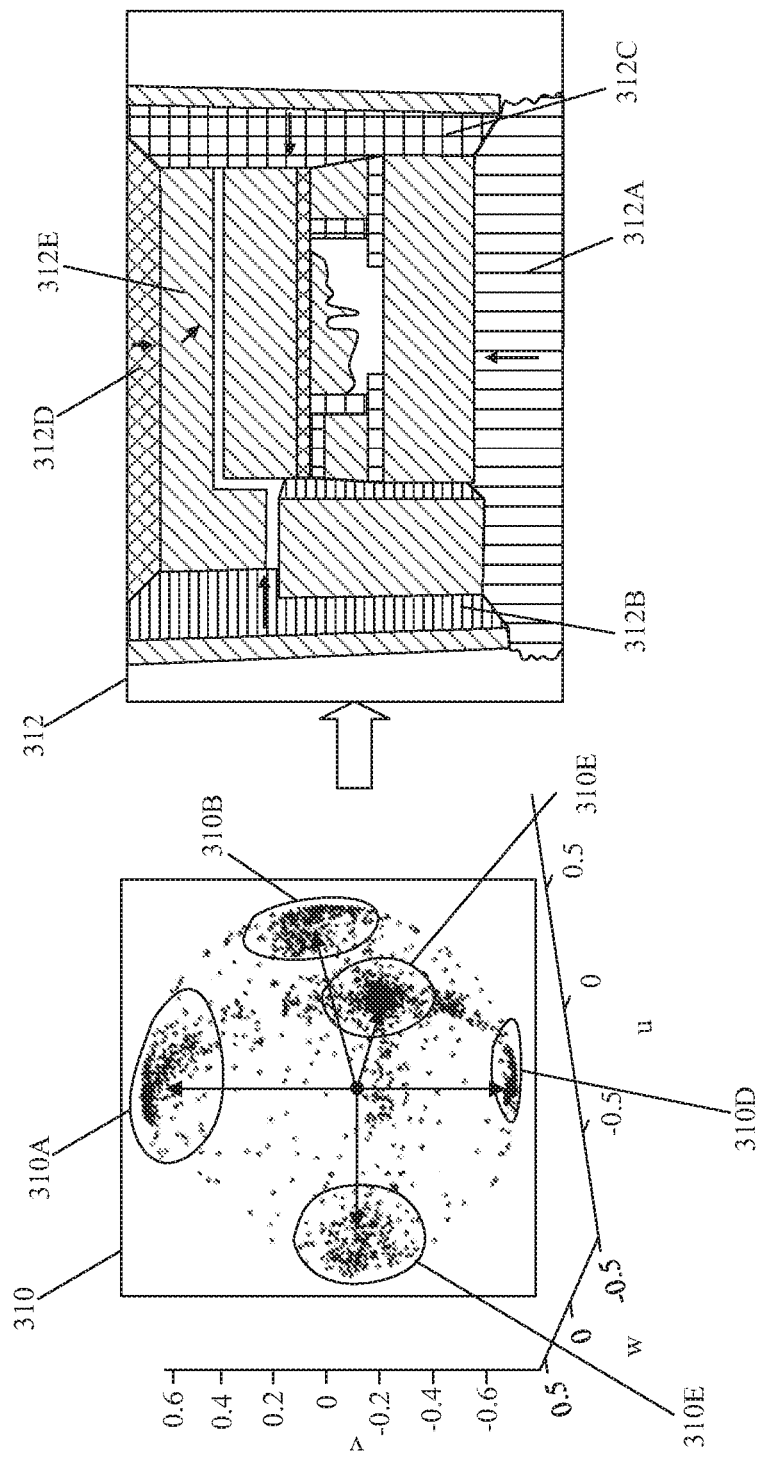

FIG. 3D illustrates the generation of the plane map based on the set of vector clusters associated with the orientation information of the plurality of vectors, in accordance with an embodiment of the disclosure. With reference to FIG. 3D, there is shown the set of vector clusters 310 on the unit sphere distribution 308 (of FIG. 3C) and a plane map 312. In accordance with an embodiment, the control circuitry 202 may be configured to generate the plane map 312 by mapping the detected plurality of planes in the image domain of the input color image frame 116. The generated plane map 312 may comprise pixels grouped in different planes of the detected plurality of planes in the plane map 312. The pixels may be grouped based on same orientation information associated with each pixel in the plane map 312 irrespective of spatial location of the pixels in the plane map 312. For example, the captured scene 110 may be an indoor scene as a room or as a cubical structure with six sides that have six surface orientations, a floor surface 312A, four walls, and a ceiling surface 312D. Out of the four walls, surfaces of three walls 312B, 312C, and 312E, are visible in the captured scene 110 as the remaining wall surface may lie behind the image-capture device 108 during capture of the sequence of color image frames 112. Since there is no surface normal at or near camera's viewing direction, such as a viewing direction from the image-capture device 108 at the time of capture of the captured scene 110, five major orientation clusters may be obtained for the 5 sides, as the set of vector clusters 310. The first vector cluster 310A of the set of vector clusters 310 may be mapped to the pixels associated the floor surface 312A and other surfaces associated with same orientation as that of the floor surface 312A in the plane map 312. Similarly, the vector cluster 310B of the set of vector clusters 310 may be mapped to the pixels associated a left wall 3128 and other surfaces associated with same orientation as that of the left wall 3128 in the plane map 312 of the scene 110. The vector cluster 310C of the set of vector clusters 310 may be mapped to the pixels associated a right wall 312C and other surfaces associated with same orientation as that of the right wall 312C in the plane map 312 of the scene 110. The vector cluster 310D of the set of vector clusters 310 may be mapped to the pixels associated the ceiling surface 312D and other surfaces associated with same orientation as that of the ceiling surface 312D in the plane map 312 of the scene 110. The vector cluster 310E of the set of vector clusters 310 may be mapped to the pixels associated with the front wall 312E and other surfaces associated with same orientation as that of the front wall 312E in the plane map 312 of the scene 110.

Figure 3E:
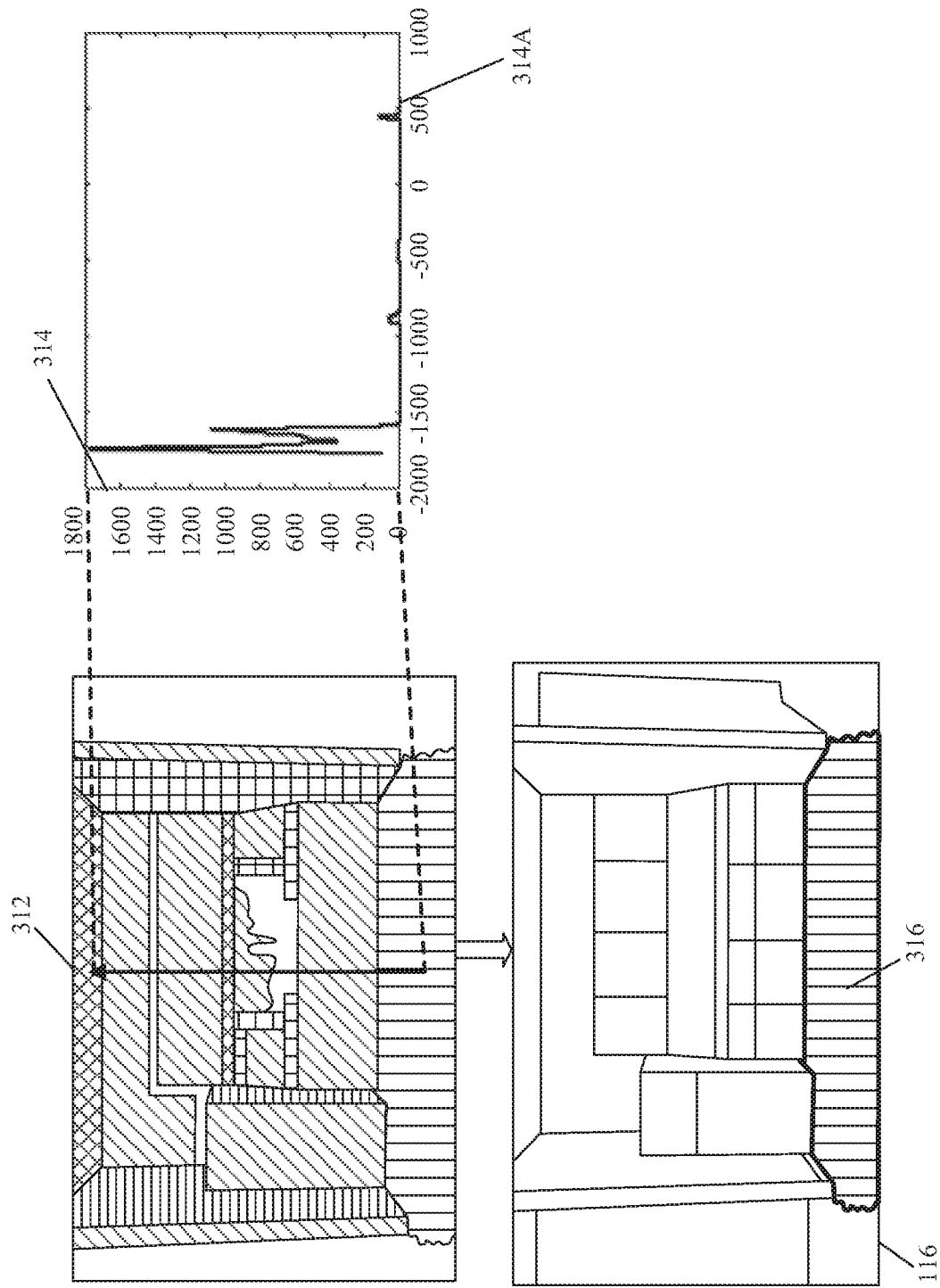

FIG. 3E illustrates the detection of ground plane from the plurality of planes of the scene 110 captured in the input color image frame 116. With reference to FIG. 3E, there is shown the plane map 312, the input color image frame 116, a height-based pixel distribution 314, a reference height 314A and a ground plane 316. In accordance with an embodiment, the control circuitry 202 may be configured to select a lowest plane in the detected plurality of planes in the plane map 312 from the reference height 314A for the scene 110 captured in the input color image frame 116. The reference height 314A may be the height of the image-capture device 108. Further, the control circuitry 202 may be configured to segregate pixels with the orientation information same as that of the selected lowest plane based on the height-based pixel distribution 314 of the pixels in the plane map 312. The lowest horizontal plane that comprises the maximum number of pixels associated with orientation information of the first vector cluster 310A, based on the height-based pixel distribution 314 of the pixels in the plane map 312 may be selected as the ground plane 316. Thus, the control circuitry 202 may be configured to precisely detect the ground plane 316 of the scene 110 captured in the input color image frame 116.

Figure 3F:
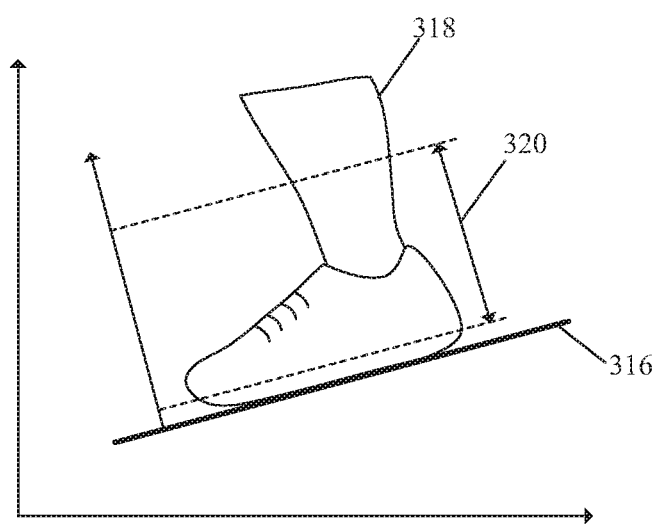

FIG. 3F illustrates the recovery of missing feet region of the human object from the detected ground plane for the segmented foreground human object, in accordance with an embodiment of the disclosure. With reference to the FIG. 3F, there is shown the ground plane 316, a feet region 318 and a defined region 320 from the level of the ground plane 316. In accordance with an embodiment, the recovery circuit 202A may be configured to detect a plurality of foreground pixels located in the defined region 320 from the level of the detected ground plane 316. For example, the defined region 320 may be in a range of 20 mm to 150 mm from the level of the detected ground plane 316. The recovery circuit 202A may be configured to recover the feet region from the detected plurality of foreground pixels located in the defined region 320 from the level of the detected ground plane 316 based on the second set of image parameters. The second set of image parameters for the recovery of the missing feet region, such as the feet region 318, of the human object may be different from the first set of image parameters. The second set of image parameters may take into account the shadow of the human object on the ground plane 316 in the input color image frame 116 and set different parameters for segregation of the feet region 318 than other regions and recover the feet region 318 from the ground plane 316 of the captured scene. The recovery circuit 202A may be configured to recover the feet region 318 in the foreground of the input color image frame 116, based on the segmentation of the feet region from the background of the input color image frame 116. The feet region 318 may comprise single feet of the human object or both foot of the human object. The feet region may comprise shoes worn by the human object on the detected ground plane 316 of the scene 110 captured in the input color image frame 116. In some embodiments, the recovery circuit 202A may be utilized to segment any missing foreground object portions or regions present on the detected ground plane 316 that may be occluded in segmentation of a foreground region of the captured scene, such as the scene 110.

Figure 3G:
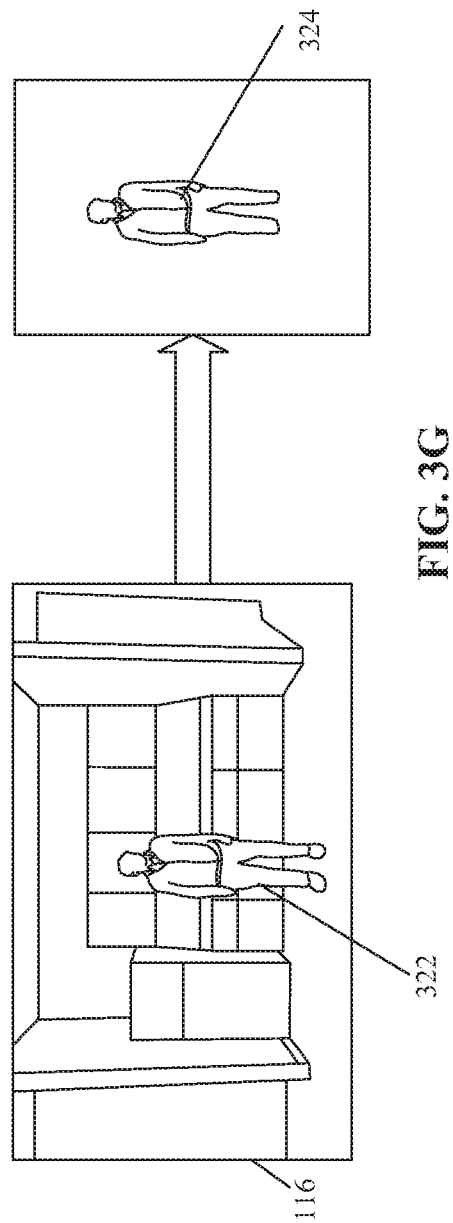
Figure 3H:
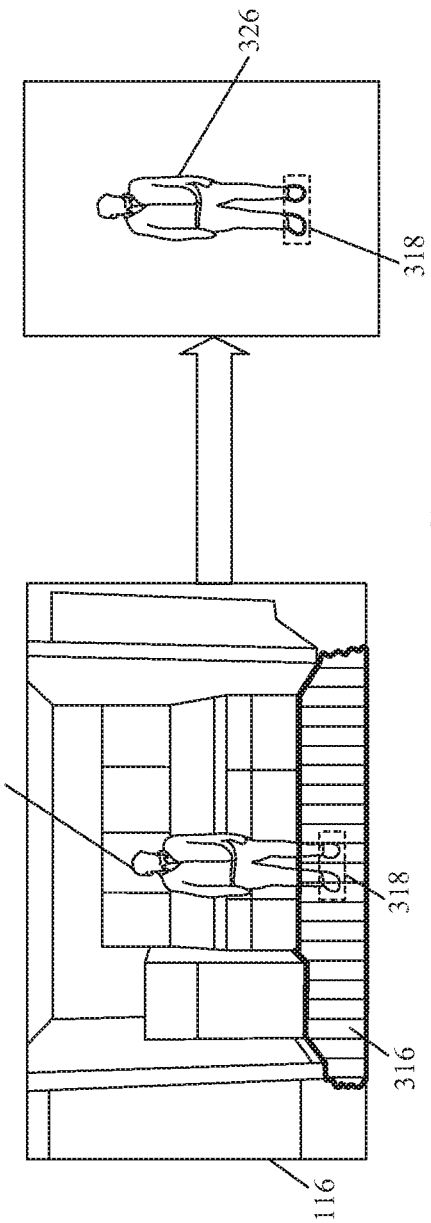

FIG. 3G and FIG. 3H illustrates a first scenario where the segmented human object devoid of the feet region of the human object and a second scenario where the segmented human object with the recovered feet region based on ground plane detection, respectively, in accordance with an embodiment of the disclosure. With reference to FIG. 3G and FIG. 3H, there is shown a human object 322 present in the scene 110 captured in the input color image frame 116, the detected ground plane 316, a first segmented human object 324 with missing feet region and a second segmented human object 326 with the feet region 318.

In accordance with an embodiment, the first scenario, as shown in FIG. 3G, depicts the segmentation of the human object 322 present in the foreground of the captured scene 110 without the detection of the ground plane, such as the ground plane 316. The object segmentation apparatus 102 may segment the human object 322 without the detection of the ground plane 316, as described in FIG. 1 and obtain the first segmented human object 324. The first segmented human object may be devoid of the feet region, such as the feet region 318. The first segmented human object 324 may be devoid of the feet region 318 due to presence of the feet region close to the ground plane 316. As the feet region 318 is present close to the ground plane 316, the difference between the feet region 318 present in the foreground and the background image of the input color image frame 116 may be minimal, as a result the first segmented human object 324 may be devoid of the feet region 318. Additionally, the feet region 318 of the human object 322 may be absent in the first segmented human object 324 due to the presence of shadows of the human object 322 on the feet region 318 close to the ground plane 316.

In accordance with an embodiment, the second scenario, as shown in FIG. 3H, depicts the segmentation of the human object 322 present in the foreground of the captured scene 110 with the detection of the ground plane, such as the ground plane 316. The ground plane 316 may be detected, as described in FIG. 1 and FIG. 3E, based on the orientation information of the plurality of vectors of the plurality of points in the generated point cloud 302. The recovery circuit 202A may be configured to detect the plurality of foreground pixels located in the defined region 320 from a level of the detected ground plane 316 (as shown for example, in FIG. 3F). The recovery circuit 202A may be configured to recover the missing feet region, such as the feet region 318, associated with the set of foreground pixels present in the defined region 320 from the level of the ground plane 316, based on the second set of image parameters. The control circuitry 202 may be further configured to update the estimated foreground mask of the human object 322 to include the detected set of foreground pixels of the feet region 318 of the human object 322. The control circuitry 202 may generate, the second segmented human object 326 with the feet region 318, based on the updated foreground mask of the human object 322 to include the feet region 318. The second segmented human object 326 may include the feet region 318 of the human object 322. The second segmented human object 326 with the recovered feet region, such as the feet region 318, may be extracted and displayed on a display screen, such as the display screen 206A.

Figure 4A:
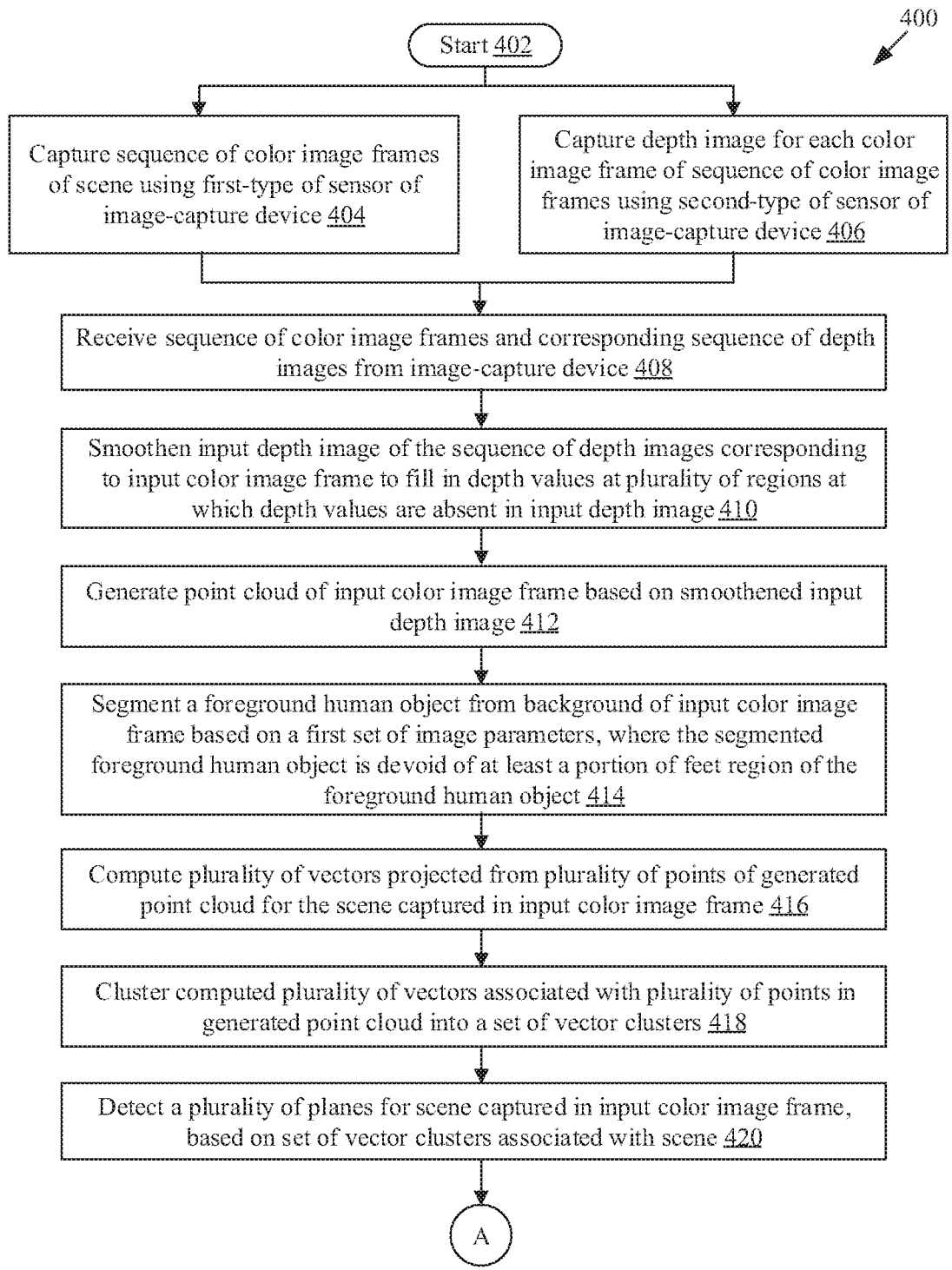
FIGS. 4A, 4B and 4C, collectively, depict a flowchart that illustrates exemplary operations for missing feet recovery of a human object from an image sequence based on ground plane detection, in accordance with an embodiment of the disclosure.
Figure 4B:
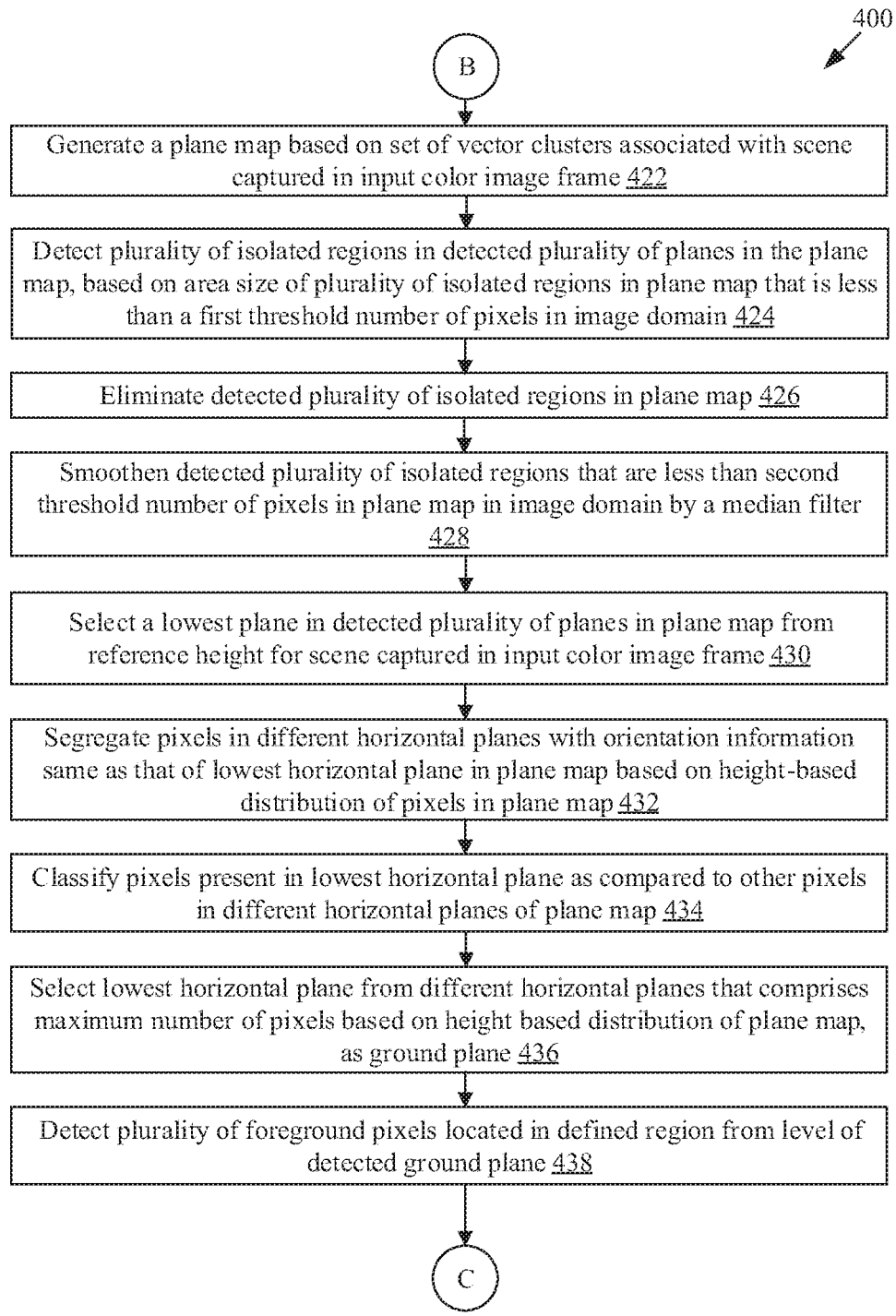
Figure 4C:
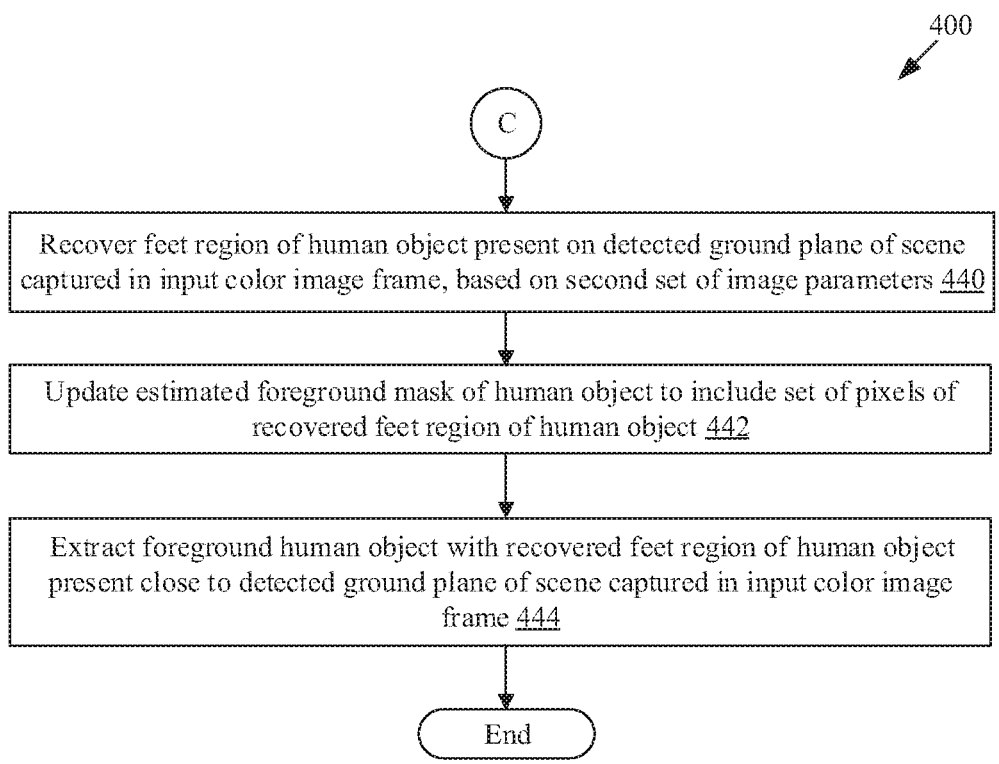

FIGS. 4A and 4B are flowcharts that collectively illustrate exemplary operations of, missing feet recovery of a human object from an image sequence based on ground plane detection, in accordance with an embodiment of the disclosure. With reference to FIGS. 4A and 4B, there is shown a flowchart 400. The flowchart 400 is described in conjunction with FIGS. 1, 2, and 3A to 3H. The operations from 404 to 444 may be implemented in the object segmentation apparatus 102. The operations of the flowchart 400 may start at 402 and proceed to 404.

At 404, the sequence of color image frames 112 of the scene 110 may be captured using the first-type of sensor 108A of image-capture device 108. The sequence of color image frames 112 of the scene 110 may be captured from a field of view of the image-capture device 108. The captured sequence of color image frames 112 may comprise a plurality of objects of the scene 110. The sequence of color image frames 112 may comprise an input color image frame 116.

At 406, a depth image for each color image frame of the sequence of color image frames 112 using the second-type of sensor 108B of the image-capture device 108. The second-type of sensor 108B may be configured to capture the sequence of depth images 114 corresponding to the sequence of color image frames 112 of the scene 110. The depth image of each color image frame of the sequence of color image frames 112 may comprise depth information associated with the scene 110 at a corresponding time instant when the respective color image frame may be captured.

At 408, the sequence of color image frames 112 and the corresponding sequence of depth images 114 may be received from the image-capture device 108. The object segmentation apparatus 102 may be configured to receive the input color image frame 116 and the corresponding input depth image 118 of the scene 110.

At 410, the input depth image 118 of the sequence of depth images 114 corresponding to the input color image frame 116 may be smoothened to fill in depth values at the plurality of regions at which depth values are absent in the input depth image 118. The control circuitry 202 may be configured to detect a plurality of regions in the input depth image 118 at which the depth values are absent. The control circuitry 202 may reduce noise in the input depth image 118 based on the smoothening of the input depth image 118.

At 412, a point cloud of the input color image frame 116 may be generated based on smoothened input depth image 118. The control circuitry 202 may be configured to generate the point cloud, such as the point cloud 302 in FIG. 3A to represent the external surface of the input color image frame 116 in a three-dimensional coordinate system. The three-dimensional coordinates of each point of the generated point cloud may be determined based on the depth values of the input depth image 118. For example, as shown in FIG. 3A, the point cloud 302 of the input color image frame 116 is generated based on the depth values of the input depth image 118

At 414, a foreground human object from a background of the input color image frame 116 may be segmented based on a first set of image parameters, where the segmented foreground human object is devoid of at least a portion of feet region of the foreground human object. The control circuitry 202 may be configured to estimate an initial foreground mask of the foreground human object using the input depth image 118 corresponding to the input color image frame 116. The control circuitry 202 may be further configured to update the initial foreground mask value of the foreground human object to a foreground mask value of the foreground human object, based on the first set of image parameters. The control circuitry 202 may generate a segmented foreground human object that may be devoid of a portion of a feet region of the foreground human object. The segmented foreground human object may be devoid of the feet region due to a presence of the feet region of the foreground human object close to a ground plane of the input color image frame 116. Additionally, the segmented foreground human object may be devoid of the feet region due to shadows of the human object onto the feet region of the human object.

At 416, a plurality of vectors projected from the plurality of points of the generated point cloud may be computed for the scene 110 captured in input color image frame 116. The control circuitry 202 may be configured to compute the plurality of vectors projected from plurality of points of the generated point cloud 302. Each vector of the computed plurality of vectors may be a surface normal vector that may be normal to a point of the plurality of points of the generated point cloud 302. The computation of the plurality of vectors projected from the plurality of points of the generated point cloud 302 is shown, for example, in FIG. 3B.

At 418, the computed plurality of vectors associated with the plurality of points in the generated point cloud may be clustered into a set of vector clusters. The control circuitry 202 may be configured to cluster the plurality of vectors projected from the plurality of points based on orientation information associated with each of the plurality of vectors. The plurality of vectors associated with same orientation information may be clustered together as the set of vector clusters 310, as shown for example in FIG. 3C.

At 420, a plurality of planes for the scene 110 captured in the input color image frame 116 may be detected based on set of vector clusters. The control circuitry 202 may be configured to detect a plurality of planes for the scene 110 captured in the input color image frame 116, based on the set of vector clusters associated with the scene 110. Each vector cluster of the set of vector clusters may correspond to a plane of the scene 110 captured in the input color image frame 116.

At 422, a plane map may be generated based on the set of vector clusters associated with scene 110 captured in the input color image frame 116. The control circuitry 202 may be configured to generate the plane map by mapping the detected plurality of planes in image domain of the input color image frame 116. The generated plane map may comprise pixels grouped in different planes of the detected plurality of planes in the plane map. The generation of the plane map, such as the plane map 312, based on the set of vector clusters 310 is shown, for example in FIG. 3D.

At 424, a plurality of isolated regions in the detected plurality of planes in the plane map 312 may be detected. The control circuitry 202 may be configured to detect the plurality of isolated regions based on an area size of the plurality of isolated regions that is less than a first threshold number of pixels in the plane map 312 in image domain. For example, the area size of each of the plurality of isolated regions in the plane map 312 may be less than the first threshold number of pixels, that is, "100" pixels, in the plane map 312 in image domain.

At 426, the detected plurality of isolated regions in the plane map 312 may be eliminated. The control circuitry 202 may be configured to eliminate the detected plurality of isolated regions in the plane map.

At 428, the detected plurality of isolated regions that are less than a second threshold number of pixels in the image domain may be smoothened by a median filter. The control circuitry 202 may be configured to smoothen the detected plurality of isolated regions that are less than a second threshold number of pixels in the plane map 312 based on the 3×3 median filter.

At 430, a lowest plane in the detected plurality of planes in the plane map may be selected from a reference height for the scene 110 captured in the input color image frame 116. The control circuitry 202 may be configured to select the lowest plane from the detected plurality of planes in the plane map 312 based on the reference height. The reference height may be the height of the image-capture device 108 that captures the sequence of color image frames 112 of the scene 110. The orientation of the selected lowest plane may be the same as the orientation of a ground plane of the captured scene 110.

At 432, pixels in different horizontal planes with the orientation information same as that of the ground plane in the plane map may be segregated based on a height-based distribution of the pixels in the plane map. The control circuitry 202 may be configured to segregate pixels in different horizontal planes with the orientation information same as that of the ground plane in the plane map 312 based on a height-based distribution of the pixels. The orientation of the surface normal vectors of the different horizontal planes may be in a direction facing upwards (i.e. from bottom to top). The segregation of the pixels in different horizontal planes based on a height-based distribution of the pixels in the plane map 312 is shown, for example in FIG. 3E.

At 434, pixels present in a lowest horizontal plane as compared to other pixels in the different horizontal planes of the plane map may be classified. The control circuitry 202 may be configured to classify pixels present in a lowest horizontal plane as compared to other pixels in the different horizontal planes of the plane map 312 based on the height based distribution of the plane map. the classification of the pixels present in the lowest horizontal plane as compared to other pixels in the different horizontal planes of the plane map is shown for example, in FIG. 3E.

At 436, the lowest horizontal plane from different horizontal planes, which comprises the maximum number of pixels based on the height based distribution of the plane map may be selected as the ground plane 316 of the captured scene 110. The control circuitry 202 may select the lowest horizontal plane from different horizontal planes, which comprises the maximum number of pixels based on the height based distribution of the plane map, as the ground plane 316. The detection of the ground plane 316 from the plane map 312 based on the classification of pixels is shown, for example, in FIG. 3E.

At 438, a plurality of foreground pixels located in a defined region from a level of the detected ground plane 316 may be detected. The recovery circuit 202A may be configured to detect the plurality of foreground pixels located in a defined region, for example 20 mm to 150 mm, from a level of the detected ground plane 316. For example, as shown in FIG. 3F, the plurality of foreground pixels may be located in the defined region 320.

At 440, the feet region of the human object present on the detected ground plane 316 of the scene 110 captured in the input color image frame 116 may be recovered. The recovery circuit 202A may be configured to recover the feet region of the human object present on the detected ground plane 316 based on a second set of image parameters. The recovery of the feet region 318 of the human object present on the detected ground plane 316 is shown, for example in FIG. 3F.

At 442, the estimated foreground mask of the human object may be updated to include the set of pixels of the recovered feet region 318 of the human object. The control circuitry 202 may be configured to update the estimated foreground mask of the human object to include the set of pixels of the recovered feet region of the human object.

At 444, the foreground human object with the recovered feet region 318 of the human object present close to the detected ground plane 316 of the scene 110 captured in the input color image frame 116 may be extracted. The control circuitry 202 may be configured to extract the foreground human object with the recovered feet region 318 and generate the segmented human object with the recovered feet region of the human object. For example, as shown in FIG. 3H, the second segmented human object 324 with feet region 318 is generated by the control circuitry 202. The control may pass to end.

In conventional systems, the human object may be segmented from the captured input color image frame of the sequence of color image frames based on object segmentation techniques. The human object segmented based on such conventional systems may be devoid of the feet region of the human object. The present disclosure may recover the missing feet region of the segmented human object and generate and extract a foreground human object with the recovered feet region of the human object. The feet region of the human object may be recovered based on a ground plane detection of the scene captured in the input color image frame. The disclosed object segmentation apparatus may capture a depth image for each color image frame of the sequence of the color image frames. The input depth image corresponding to the input color image frame may be utilized to generate the point cloud of the input color image frame in the three-dimensional coordinate space. The ground plane of the scene may be detected based on a plurality of surface normal vectors projected from each of the plurality of points of the generated point cloud of the input color image frame. The disclosed object segmentation apparatus further utilizes the second set of image parameters to detect the plurality of foreground pixels of the feet region of the human object that are present in the defined region from the level of the detected ground plane. Thus, the disclosed object segmentation apparatus 102 considers the shadows of the human object present of the feet region on the ground plane and detects the plurality of foreground pixels of the feet region of the human object. As the difference between depth values of the foreground feet region and the depth values of the background of the input color image frame are minimal, the disclosed object segmentation apparatus accurately detects the plurality of foreground pixels of the feet region from the level of the detected ground plane based on the second set of image parameters. Thus, the disclosed object segmentation apparatus is capable of recovering the feet region (which is otherwise very difficult to detect and segment) by segmenting the feet region close to the detected ground plane based on the second set of image parameters. Further, the object segmentation apparatus updates the segmented foreground human object to include the recovered feet region of the human object.

In accordance with an embodiment of the disclosure, an object segmentation apparatus for missing feet recovery of a human object from an image sequence based on ground plane detection is disclosed. The object segmentation apparatus, such as the object segmentation apparatus 102 (FIG. 1), may comprise a memory (such as the memory 204) and one or more circuits (such as the control circuitry 202 and the recovery circuit 202A (FIG. 2)) coupled to an image-capture device (such as the image-capture device 108). The image-capture device 108 may comprise one or more sensors (such as the first-type of sensor 108A and the second-type of sensor 108B (FIG. 1)). The image-capture device 108 may capture a sequence of color image frames (such as the sequence of color image frames 112) and a sequence of depth images (such as the sequence of depth images 114) of a scene (such as the scene 110 (FIG. 1)). The control circuitry 202 may be configured to receive an input color image frame (such as the input color image frame 116 in FIG. 1) and a corresponding input depth image (such as the input depth image 118 in FIG. 1). The control circuitry 202 may be further configured to generate a point cloud (such as the point cloud 302 in FIG. 3B) for the input color image frame 116 of the sequence of color image frames 112 based on the corresponding input depth image 118. The control circuitry 202 may segment a foreground human object from a background of the input color image frame 116 based on a first set of image parameters. The segmented foreground human object may be devoid of at least a portion of a feet region of the foreground human object. The control circuitry 202 may be configured to detect a ground plane (such as the ground plane 316 in FIG. 3E) for the scene 110 captured in the input color image frame 116. The ground plane 316 may be detected based on orientation information associated with each vector projected from each point (such as the point of interest "i" 304 in FIG. 3B) in the generated point cloud 302. The recovery circuit 202A may be configured to recover a feet region (such as the feet region 318 in FIG. 3F) in a defined region (such as the defined region 320 in FIG. 3F) from a level of the detected ground plane 316 in the input color image frame 116. The feet region 318 may be recovered based on a second set of image parameters that are different from the first set of image parameters. The control circuitry may be further configured to extract the foreground human object with the recovered feet region (such as the second segmented human object 326 in FIG. 3H) from the background of the input color image frame 116 of the sequence of color image frames 112. The foreground human object with the recovered feet region (such as the second segmented human object 326 in FIG. 3H) may be extracted based on the detection of ground plane 316 and the determined plurality of foreground pixels in the defined region 320 from the level of the detected ground plane 316.

Various embodiments of the disclosure may provide a non-transitory, computer-readable medium and/or storage medium, and/or a non-transitory machine readable medium and/or storage medium stored thereon, a set of instructions executable by a machine and/or a computer that comprises one or more circuits communicatively coupled to an image-capture device. The set of instructions may be executable by the machine and/or the computer to perform the steps that comprise capture of a sequence of color image frames of a scene and a depth image for each corresponding color image frame of the sequence of color image frames. A point cloud may be generated for an input color image frame of the sequence of color image frames received. The point cloud may be generated based on a corresponding input depth image for the input color image frame received. A foreground human object may be segmented from a background of the input color image frame based on a first set of image parameters. The segmented foreground human object may be devoid of at least a portion of a feet region of the foreground human object. A ground plane may be detected for the scene captured in the input color image frame, based on orientation information associated with each vector projected from each point in the generated point cloud. A feet region may be recovered in a defined region from a level of the detected ground plane in the input color image frame, based on a second set of image parameters that may be different from the first set of image parameters. The foreground human object may be extracted with the recovered feet region from the background of the input color image frame of the sequence of color image frames. The foreground human object may be extracted based on the detection of ground plane and the determined plurality of foreground pixels in the defined region from the level of the detected ground plane.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. An object segmentation system, comprising:
    a first-type of sensor configured to capture a sequence of color image frames of a scene;
    a second-type of sensor configured to capture a depth image for each corresponding color image frame of the sequence of color image frames; and
    control circuitry configured to:
        generate a point cloud for an input color image frame of the sequence of color image frames received from the first-type of sensor, based on a corresponding input depth image for the input color image frame received from the second-type of sensor;
        segment a foreground human object from a background of the input color image frame based on a first set of image parameters, wherein the segmented foreground human object is devoid of at least a portion of a feet region of the foreground human object;
        detect a ground plane for the scene captured in the input color image frame by clusterization of a plurality of vectors projected from a plurality of points in the generated point cloud into a set of vector clusters, wherein the ground plane for the scene is detected based on orientation information associated with one vector cluster of the set of vector clusters in the generated point cloud;
        recover the feet region in a defined region from a level of the detected ground plane in the input color image frame, based on a second set of image parameters that are different from the first set of image parameters; and
        extract the foreground human object that includes the recovered feet region from the background of the input color image frame of the sequence of color image frames, based on the detection of the ground plane and a plurality of foreground pixels in the defined region from the level of the detected ground plane.

2. The system according to claim 1, wherein the control circuitry is further configured to:
    detect a plurality of regions in the input depth image at which depth values are absent; and
    smoothen the input depth image by a median filter and a uniform filter to fill the depth values at the plurality of regions and reduce noise in the input depth image.

3. The system according to claim 1, wherein the control circuitry is further configured to determine a three-dimensional (3D) coordinate of each point in the generated point cloud, based on the input depth image.

4. The system according to claim 3, wherein the control circuitry is further configured to compute the plurality of vectors projected from the plurality of points in the generated point cloud for the scene captured in the input color image frame, based on three-dimensional (3D) coordinates of a point-of-interest and two neighboring points of the point-of-interest in the plurality of points of the generated point cloud, wherein the computed plurality of vectors associated with the plurality of points in the generated point cloud are clustered into the set of vector clusters, based on orientation information associated with each of the computed plurality of vectors.

5. The system according to claim 4, wherein the control circuitry is further configured to detect a plurality of planes for the scene captured in the input color image frame, based on the set of vector clusters associated with the scene captured in the input color image frame.

6. The system according to claim 5, wherein the control circuitry is further configured to generate a plane map based on the set of vector clusters associated with the scene captured in the input color image frame, wherein the detected plurality of planes in image domain of the input color image frame is mapped to generate the plane map.

7. The system according to claim 6, wherein the plane map comprises pixels grouped in different planes of the detected plurality of planes in the plane map, based on same orientation information associated with each pixel in the plane map irrespective of spatial location of the pixels in the plane map in the image domain of the input color image frame of the scene.

8. The system according to claim 7, wherein the control circuitry is further configured to detect a plurality of isolated regions in the detected plurality of planes in the plane map, based on an area size of the plurality of isolated regions in the plane map that is less than a first threshold number of pixels in the image domain.

9. The system according to claim 8, wherein the control circuitry is further configured to eliminate the detected plurality of isolated regions in the plane map followed by a smoothening operation by a median filter to smoothen the detected plurality of isolated regions that are less than a second threshold number of pixels in the image domain.

10. The system according to claim 7, wherein the control circuitry is further configured to select a lowest plane in the detected plurality of planes in the plane map from a reference height for the scene, wherein the reference height corresponds to a height of the first-type of sensor that captures the sequence of color image frames of the scene, and wherein the selected lowest plane in the detected plurality of planes in the plane map is the ground plane for the scene captured in the input color image frame.

11. The system according to claim 7, wherein the control circuitry is further configured to:
    segregate the pixels in different horizontal planes in the plane map based on a height-based distribution of the pixels in the plane map; and
    classify pixels present in a lowest horizontal plane as compared to other pixels in the different horizontal planes as the pixels of the ground plane based on the height-based distribution of the pixels in the plane map.

12. The system according to claim 1, wherein the control circuitry is further configured to estimate a foreground mask of the foreground human object in the input color image frame of the scene using the input depth image and the first set of image parameters, and by binarization of a difference between the input color image frame and a background image of the input color image frame, wherein the foreground human object is segmented from the background of the input color image frame based on the estimated foreground mask.

13. The system according to claim 12, wherein the control circuitry is further configured to update the estimated foreground mask to include a set of pixels in the defined region from the level of the detected ground plane in the input color image frame, wherein the set of pixels corresponds to pixels of the feet region that are recovered based on the second set of image parameters.

14. A method, comprising:
   in an object segmentation system comprising a first-type of sensor, a second-type of sensor, and a control circuitry:
   capturing, by the first-type of sensor, a sequence of color image frames of a scene;
   capturing, by the second-type of sensor, a depth image for each corresponding color image frame of the sequence of color image frames;
   generating, by the control circuitry, a point cloud for an input color image frame of the sequence of color image frames received from the first-type of sensor, based on a corresponding input depth image for the input color image frame received from the second-type of sensor;
   segmenting, by the control circuitry, a foreground human object from a background of the input color image frame based on a first set of image parameters, wherein the segmented foreground human object is devoid of at least a portion of a feet region of the foreground human object;
   detecting, by the control circuitry, a ground plane for the scene captured in the input color image frame, by clusterization of a plurality of vectors projected from a plurality of points in the generated point cloud into a set of vector clusters, wherein the ground plane for the scene is detected based on orientation information associated with one vector cluster of the set of vector clusters in the generated point cloud;
   recovering, by the control circuitry, the feet region in a defined region from a level of the detected ground plane in the input color image frame, based on a second set of image parameters that are different from the first set of image parameters; and
   extracting, by the control circuitry, the foreground human object that includes the recovered feet region from the background of the input color image frame of the sequence of color image frames, based on the detection of the ground plane and a plurality of foreground pixels in the defined region from the level of the detected ground plane.

15. The method according to claim 14, further comprising:
   detecting, by the control circuitry, a plurality of regions in the input depth image at which depth values are absent; and
   smoothing, by the control circuitry, the input depth image by a median filter and a uniform filter to fill the depth values at the plurality of regions and reduce noise in the input depth image.

16. The method according to claim 14, further comprising determining, by the control circuitry, a three-dimensional (3D) coordinate of each point in the generated point cloud, based on the input depth image.

17. The method according to claim 16, further comprising computing, by the control circuitry, the plurality of vectors projected from the plurality of points in the generated point cloud for the scene captured in the input color image frame, based on three-dimensional (3D) coordinates of a point-of-interest and two neighboring points of the point-of-interest in the plurality of points of the generated point cloud.

18. The method according to claim 17, further comprising detecting, by the control circuitry, a plurality of planes for the scene captured in the input color image frame, based on the set of vector clusters associated with the scene captured in the input color image frame.

19. The method according to claim 18, further comprising generating, by the control circuitry, a plane map based on the set of vector clusters associated with the scene captured in the input color image frame, wherein the plane map is generated by mapping the detected plurality of planes in image domain of the input color image frame.

20. The method according to claim 19, wherein the plane map comprises pixels grouped in different planes of the detected plurality of planes in the plane map, based on same orientation information associated with each pixel in the plane map irrespective of spatial location of the pixels in the plane map in the image domain of the input color image frame of the scene.

* * * * *